(12) United States Patent
Abe (10) Patent No.: US 8,511,919 B2
(45) Date of Patent: Aug. 20, 2013

(54) LIGHT QUANTITY ADJUSTMENT DEVICE AND IMAGE PICKUP APPARATUS INCLUDING SAME

(75) Inventor: Hirofumi Abe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/367,152

(22) Filed: Feb. 6, 2012

(65) Prior Publication Data

US 2012/0201530 A1    Aug. 9, 2012

(30) Foreign Application Priority Data

Feb. 9, 2011    (JP) .................................. 2011-025582

(51) Int. Cl.
*G03B 9/02*    (2006.01)
(52) U.S. Cl.
USPC ............ 396/505; 396/507; 348/342; 359/739
(58) Field of Classification Search
USPC ................. 396/505–507; 348/342; 359/739
See application file for complete search history.

(56) References Cited

U.S. PATENT DOCUMENTS

| | | | |
|---|---|---|---|
| 6,924,946 B2 * | 8/2005 | Watanabe et al. ............. | 359/739 |
| 6,984,078 B2 * | 1/2006 | Inoue et al. .................... | 396/510 |
| 2008/0037092 A1 * | 2/2008 | Umezu et al. ................. | 359/227 |
| 2012/0288271 A1 * | 11/2012 | Muramatsu et al. .......... | 396/505 |

FOREIGN PATENT DOCUMENTS

JP         8-043878 A      2/1996

* cited by examiner

*Primary Examiner* — Clayton E LaBalle
*Assistant Examiner* — Warren K Fenwick
(74) *Attorney, Agent, or Firm* — Canon U.S.A., Inc. IP Division (57) ABSTRACT

A light quantity adjustment device includes: an aperture mechanism that varies an aperture opening through drive of aperture blades to restrict a quantity of light that passes through the aperture opening; and an ND filter inserted in and removed from an optical path on a light incident side or a light exit side of the aperture opening. The ND filter has a distribution of transmittance in which the transmittance differs in a direction of interposition of the ND filter in the optical path of the aperture opening, and includes a recessed portion formed by recessing a center portion of a distal-end region of the ND filter on a side of interposition in the optical path of the aperture opening in a direction opposite the direction of interposition.

9 Claims, 10 Drawing Sheets

ND filter when the aperture opening is not covered by the ND
LIGHT QUANTITY ADJUSTMENT DEVICE AND IMAGE PICKUP APPARATUS INCLUDING SAME

BACKGROUND OF THE INVENTION

1. Field of the Invention

The present invention relates to a light quantity adjustment device that is provided in an image pickup apparatus such as a video camera, a monitoring camera, and a digital camera and that is suitable to control the quantity of light to be incident on an image pickup element using an aperture mechanism and a neutral density (ND) filter.

2. Description of the Related Art

Image pickup apparatuses such as video cameras and digital cameras use a light quantity adjustment device that uses a plurality of aperture blades to form an aperture opening. In operation, the light quantity adjustment device varies the shape or area of the aperture opening to adjust the quantity of light incident on an image pickup element. Adjusting the light quantity by varying the area of the aperture opening reduces the cross-sectional area (diameter) of the aperture opening when a luminous object is to be photographed. When the cross-sectional area of aperture opening is reduced excessively, diffraction of light tends to degrade optical performance of the image pickup apparatus. Thus, an ND filter is used to reduce the quantity of light incident on the image pickup element without reducing the cross-sectional area of the aperture opening to the point that it becomes too small. Examples of such conventional light quantity adjustment devices have been previously disclosed.

Japanese Patent application Laid-Open No. 8-43878 discloses an aperture device in which an ND filter with a transmittance that varies radially stepwise or continuously is provided to a part of each of two aperture blades. The transmittance of the ND filter is set to become gradually lower from the optical axis toward the outer side in a radial direction. In this manner, the aperture opening is shielded by the ND filter to reduce the transmissivity from the center of the optical axis toward the outside in the radial direction, so that the aperture opening is not likely to become too small.

U.S. Patent Application Publication No. 2008/0037092 discloses a light quantity adjustment device in which an aperture and an ND filter are driven separately and in which the ND filter includes a transparent portion sized to fully cover the entirety of an aperture opening when the opening has a predetermined area. When the aperture opening has the predetermined area, the ND filter is controlled so as to move without a halt from a position retracted from the aperture opening to a position at which the transparent portion fully covers the entirety of the aperture opening with the predetermined area.

In the aperture device according to Japanese Patent Laid-Open No. 8-43878, the degree of overlap of the ND filter with the aperture opening is adjusted to reduce the difference in light quantity that occurs on the plane of focus, and hence unevenness in light quantity in the photographing screen is prevented. In the case where the entirety of the aperture opening is not covered by the ND filter, a phase difference may be caused in the direction perpendicular to the distal-end surface of the ND filter depending on the presence or absence of the ND filter in the aperture opening, which tends to reduce resolving power in the direction perpendicular to the distal-end surface of the ND filter. In the direction parallel to the distal-end surface of the ND filter, on the other hand, no phase difference is caused, and therefore resolving power is not reduced. This results in a difference in resolving power between the direction parallel to the distal-end surface of the ND filter and the direction perpendicular thereto. In addition, the end surface of the ND filter is formed to have a straight shape, which causes diffraction of light in the direction perpendicular to the straight shape of the end surface of the ND filter when the aperture opening is not covered by the ND filter. Therefore, a straight light streak with a high intensity may be caused when a luminous object enters the photographing screen. When such a light streak extending in the vertical direction of the photographing screen discussed above is caused, the light streak may look as if it was a smear extending in the vertical direction of the photographing screen, even though no smear would be caused when a CMOS sensor, rather than a CCD sensor, is used in an image pickup apparatus.

In the light quantity adjustment device according to U.S. Patent Application Publication No. 2008/0037092, a state with the end surface of the ND filter located in the aperture opening is determined as an unused region. Therefore, unlike the device according to Japanese Patent Laid-Open No. 8-43878, no difference in resolving power is caused between the direction of the distal-end surface of the ND filter and the direction perpendicular thereto. In addition, the distal-end surface of the ND filter is formed to have a convex shape, which does not cause a light streak with a high intensity extending in the vertical direction of the photographing screen similar to a smear. In the device according to U.S. Patent Application Publication No. 2008/0037092, the size of the ND filter in the driving direction tends to be large by an amount allowing passage of the unused region. In order to reduce the size of the ND filter with the unused region maintained, it is necessary to reduce the region (aperture opening) for reducing the quantity of light that passes through the aperture opening.

This may cause degradation in image quality due to diffraction with a small aperture. Further, if control is performed such that the end surface of the ND filter momentarily passes through the aperture opening in order to avoid the unused region, an unnatural image may be momentarily captured while recording a movie, for example.

The present invention provides a light quantity adjustment device capable of reducing occurrence of a light streak extending in the vertical direction of a photographing screen, reducing the difference in resolving power between a particular direction with respect to the photographing screen and the direction perpendicular thereto, and restricting the quantity of light that passes through an aperture opening, and also provides an image pickup apparatus having the light quantity adjustment device.

SUMMARY OF THE INVENTION

A light quantity adjustment device according to the present invention includes: an aperture mechanism that varies an aperture opening through drive of aperture blades to restrict a quantity of light that passes through the aperture opening; and an ND filter inserted in and removed from an optical path on a light incident side or a light exit side of the aperture opening. The ND filter has a distribution of transmittance in which the transmittance differs in a direction of interposition of the ND filter in the optical path of the aperture opening, and includes a recessed portion formed by recessing a center portion of a distal-end region of the ND filter on a side of interposition in the optical path of the aperture opening in a direction opposite the direction of interposition.

Further features of the present invention will become apparent from the following description of exemplary embodiments with reference to the attached drawings.

DESCRIPTION OF THE EMBODIMENTS

A light quantity adjustment device according to the present invention includes an aperture mechanism 2 that varies an aperture opening through drive of aperture blades 21 and 22 to restrict the quantity of light that passes through the aperture opening. The light quantity adjustment device also includes an ND filter 1, which is inserted in and removed from an optical path of light passing through the aperture opening. More specifically, the ND filter 1 is interposed (inserted) either on the light incident side or the light exit side of the aperture opening in a direction A substantially perpendicular to the optical path. The ND filter 1 has a transmittance distribution in which the transmittance differs among regions through which light flux passes. More specifically, transmittance distribution of ND filter 1 varies in the direction of interposition of the ND filter 1 in the optical path of the aperture opening. The ND filter 1 includes a recessed portion 102 at a distal end thereof. The recessed portion may have a V-shape, a U-shape, a circular shape, an elliptical shape, or the like, and may be formed by recessing (e.g., cutting or machining) the center portion of the distal-end region of the ND filter 1 on the side of initial interposition in the optical path of the aperture opening. The recessed portion 102 is made in the direction opposite to the direction of interposition.

First Embodiment

Figure 1:
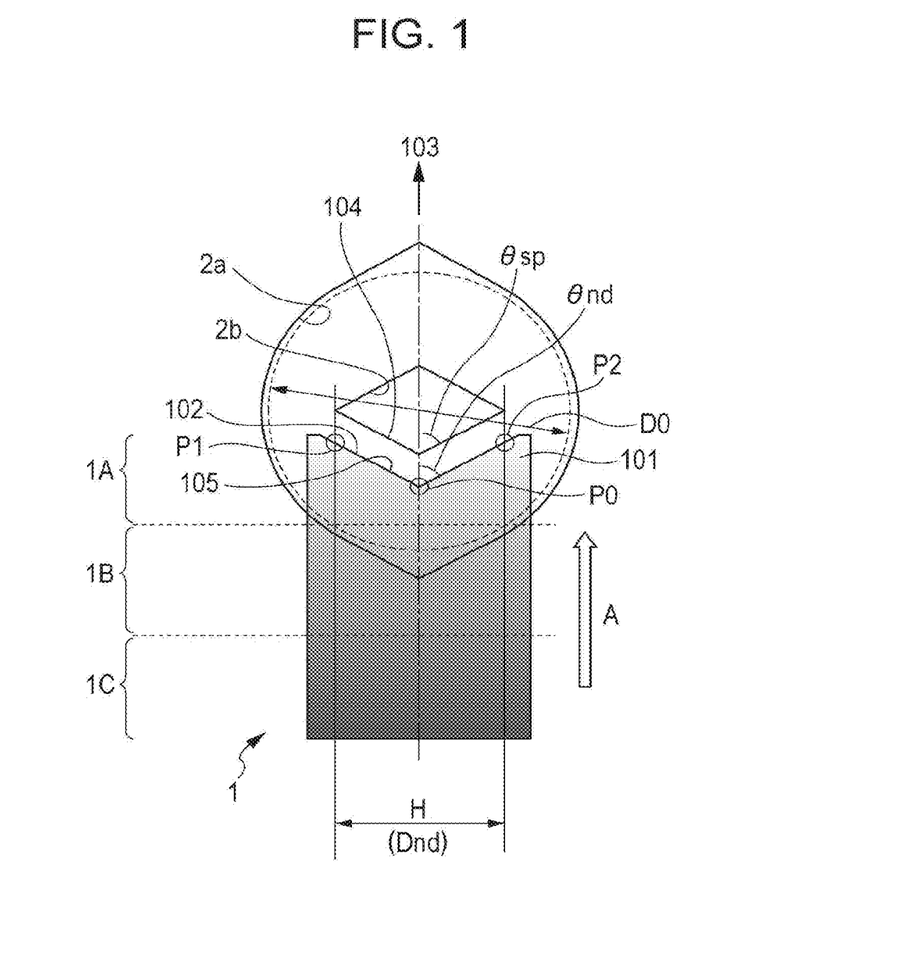
FIG. 1 is a schematic diagram showing the relationship between an ND filter and the shape of an aperture opening according to a first embodiment of the present invention.

FIG. 1 is a schematic diagram showing the relationship between the ND filter 1 and the aperture opening of the aperture mechanism 2 in a light quantity adjustment device according to a first embodiment of the present invention. FIG. 1 shows a state in which the ND filter 1 is interposed in a part of the aperture opening of the aperture mechanism 2 as seen from the direction of passage of light flux (direction of the optical axis of an imaging optical system (not shown)). In FIG. 1, reference symbol 2a indicates the aperture opening in the open state, and 2b indicates the aperture opening at the time when the ND filter 1 is inserted in the aperture opening (interposition aperture opening). Reference symbol D0 indicates a light passage region of the imaging optical system with the aperture opening in the open state. Reference symbol A indicates the direction of insertion of the ND filter 1 in the optical path.

Reference symbol H indicates the width of the effective region of the ND filter 1 through which light flux passes when the ND filter 1 is disposed in the optical path (the width of the photographing screen in the horizontal direction). Reference symbol P0 indicates a first region that passes through the center portion of the opening when the ND filter 1 is inserted in the optical path. Reference symbols P1 and P2 indicate second regions that pass through the peripheral portions of the opening. The recessed (cut) portion 102 may have a V-shape, a U-shape, a circular shape, an elliptical shape, or the like formed by recessing the center portion of a distal-end region 101 of the ND filter 1 in the direction opposite the direction of interposition A in which the ND filter 1 is inserted in and removed from the aperture opening.

That is, the recessed portion 102 formed at the end portion (distal-end portion) of the ND filter 1 according to the embodiment is configured as follows. Inclination is made from the first region P0, which passes through the center portion of the aperture opening during insertion of the ND filter 1 in the aperture opening, to the second regions P1 and P2, which pass through the peripheral portions of the aperture opening, such that the first region P0 is recessed with respect to the second regions P1 and P2.

Figure 2:
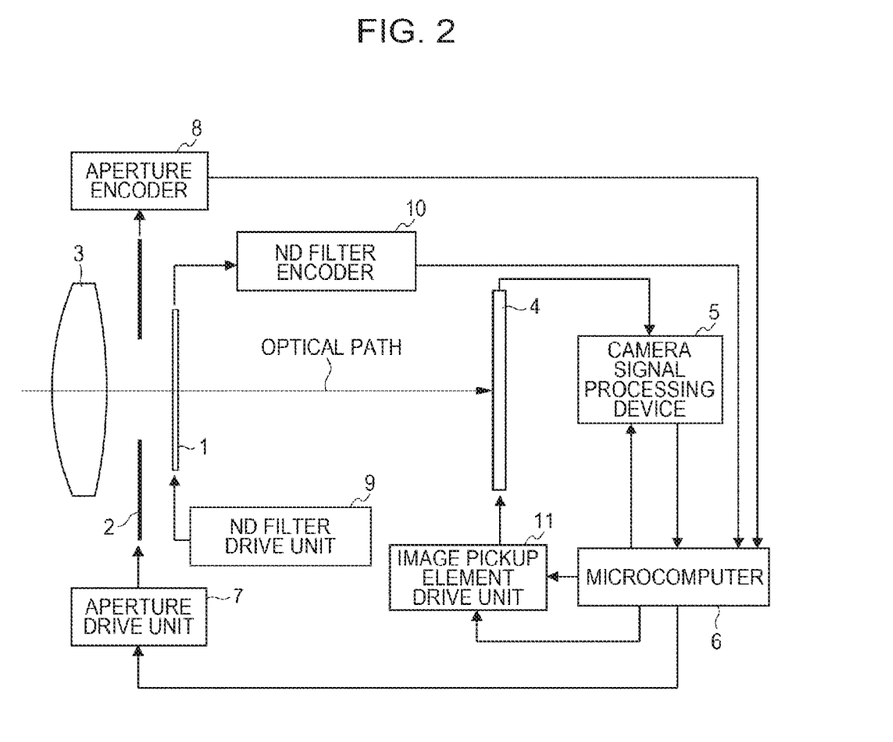
FIG. 2 is a block diagram showing the configuration of an image pickup apparatus according to the present invention.

FIG. 2 is a block diagram showing the configuration of an image pickup apparatus including the light quantity adjustment device according to the present invention. A description will be made with reference to FIG. 2. Reference numeral 1 denotes an ND filter. Reference numeral 2 denotes an aperture mechanism. Reference numeral 3 denotes a photographing lens. The photographing lens 3 is formed by a plurality of lenses. The photographing lens 3 may be disposed on either the object side or the image side with respect to the aperture mechanism 2 and the ND filter 1. An unlabeled solid arrow traveling left to right of the figure through the center of photographing lens 3 represents an optical path of light passing through the aperture mechanism 2. Reference numeral 4 denotes an image pickup element that receives incident light to perform photoelectric conversion. Reference numeral 5 denotes a signal processing device (camera signal processing device) that generates a standard television signal from a signal resulting from the photoelectric conversion by performing electrical amplification, conversion from an analog signal into a digital signal, gamma correction, color separation, color-difference matrix processing, and so forth.

Reference numeral 6 denotes a microcomputer or microprocessor that issues various process commands to control the entirety of the image process apparatus. Reference numeral 7 denotes an aperture drive unit such as a drive motor that drives the aperture blades. Reference numeral 8 denotes an encoder that detects the state of the aperture mechanism 2. Reference numeral 9 denotes an ND filter drive unit such as a drive motor that inserts the ND filter 1 in and removes the ND filter 1 from the optical path. Reference numeral 10 denotes an encoder that detects the state of the ND filter 1. Reference numeral 11 denotes an image pickup element drive unit that reads the signal resulting from the photoelectric conversion and that controls a so-called electronic shutter function that controls the time of accumulation of the signal. It should be noted, however, that the encoders 8 and 10 are not necessarily required.

Figure 3:
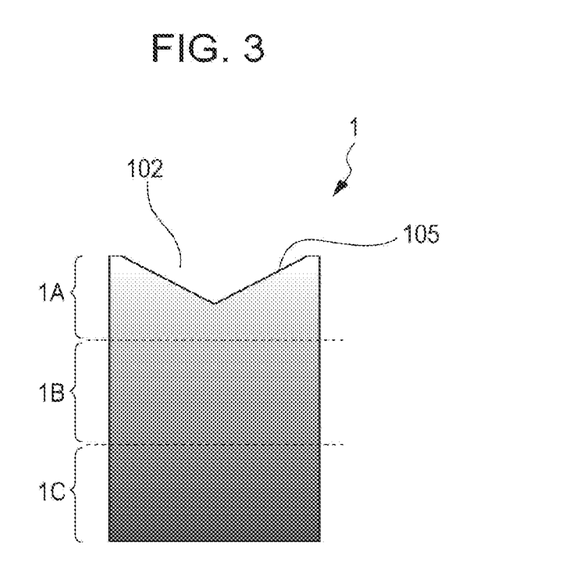
FIG. 3 is a schematic diagram showing the configuration of the ND filter according to the first embodiment of the present invention.
Figure 4:
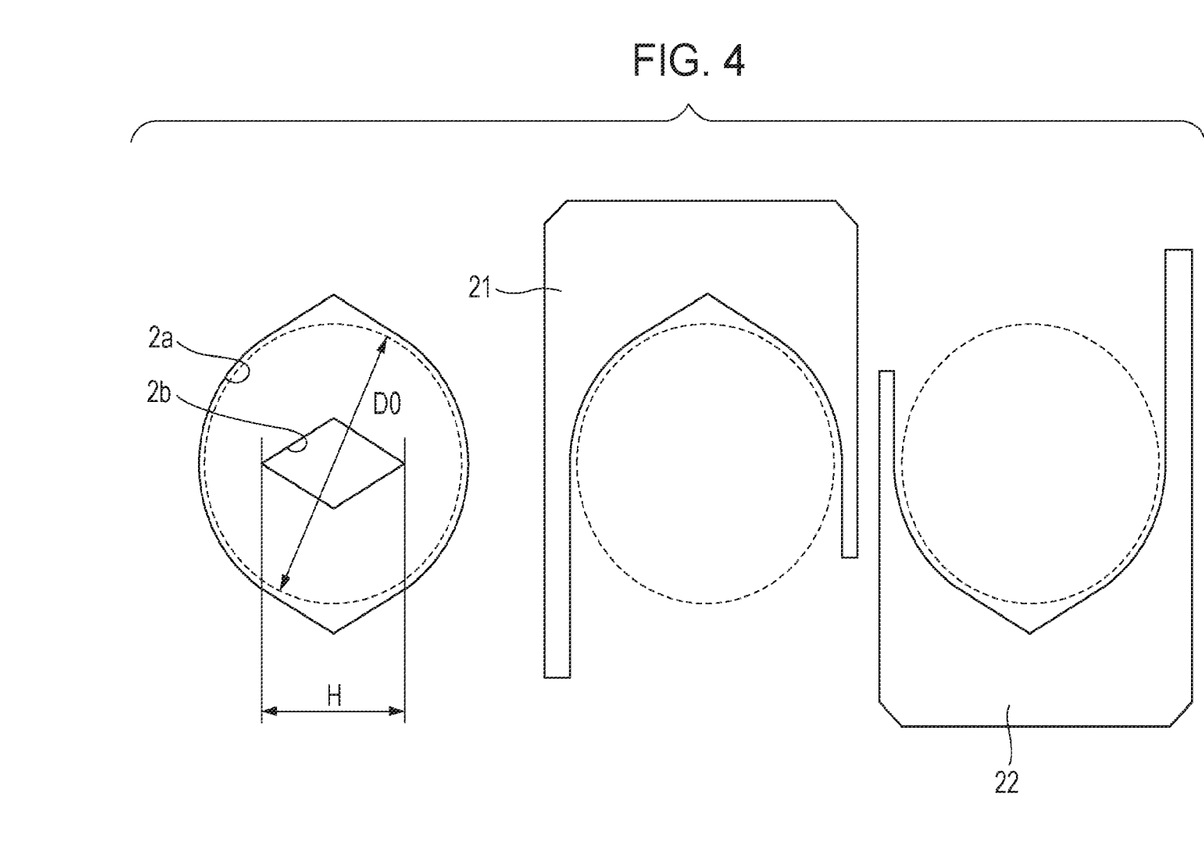
FIG. 4 is a schematic diagram showing the shape of the aperture opening and the configuration of aperture blades according to the first embodiment of the present invention.

FIG. 3 shows a schematic configuration of the ND filter 1 according to the embodiment. The ND filter 1 has a distribution of transmittance formed by a region 1A with a uniform transmittance, a region 1B with a continuously varying transmittance, and a region 1C with a uniform transmittance lower than that of the region 1A, the regions 1A to 1C being arranged in this order in the direction of interposition in the aperture opening. The boundaries between the region 1A and the region 1B and between the region 1B and the region 1C are represented by dotted lines. FIG. 4 shows a schematic configuration of the aperture blades 21 and 22 of the aperture mechanism 2 and the aperture opening 2a, 2b formed by the aperture blades 21 and 22 according to the embodiment.

Figure 5:
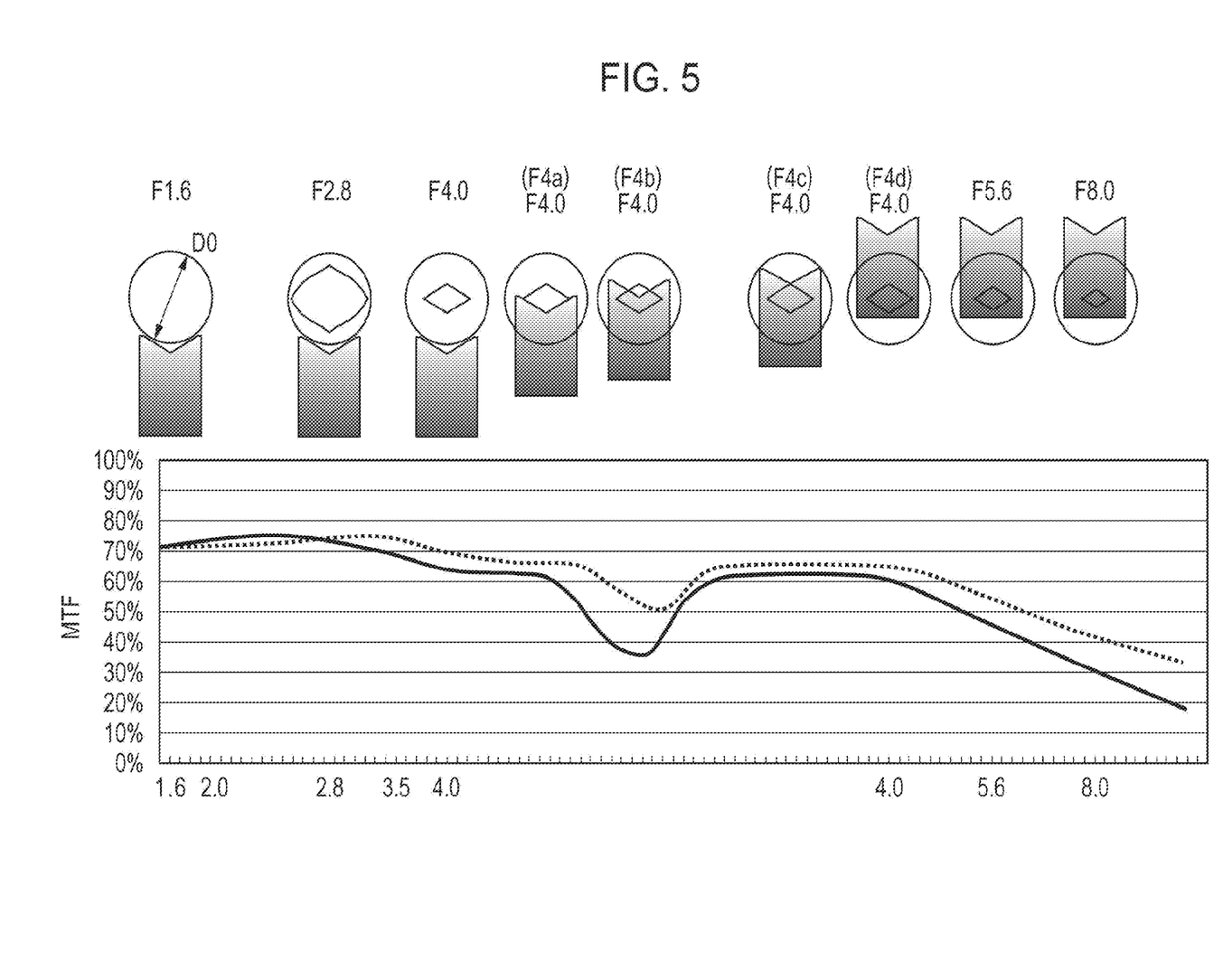
FIG. 5 illustrates the relationship between the state of the ND filter and the aperture opening and MTF according to the first embodiment of the present invention.

FIG. 5 shows exposure control performed by the aperture mechanism 2 and the ND filter 1 according to the embodiment. The upper portion of FIG. 5 shows the positional relationship between the aperture opening (F number) formed by the aperture blades and the ND filter 1 at each aperture value of the aperture mechanism 2. The lower portion of FIG. 2 shows a graph in which the horizontal axis represents the aperture value (Fno) with the light quantity adjustment device applied to a photographing optical system, and the vertical axis represents the MTF of the photographing optical system. The arrangement of figures in the upper part of FIG. 5 generally corresponds to the horizontal axis of the graph in the lower part of FIG. 5. The MTF is indicated on the assumption that the photographing optical system is a common photographing lens. The ND filter 1 starts moving from the position at which it is disposed at an aperture value of F1.6 in FIG. 5. In the MTF graph in the lower part of FIG. 5, the solid line indicates the MTF read in the vertical direction of the photographing screen, and the dotted line indicates the MTF read in the horizontal direction of the photographing screen.

The light quantity adjustment device according to the embodiment varies only the aperture opening from the opening 2a in the open state (F1.6) to a particular opening 2b (F4.0) (F4a). In the case where the object becomes more luminous, the ND filter 1 is inserted with the aperture opening kept at the opening 2b (F4a) to reduce the transmittance (F4b) (F4c). After the transmittance is reduced until the maximum drive amount of the ND filter 1 is reached (F4d), the area of the aperture opening 2b is reduced to reduce the amount of light that passes through the aperture opening 2b.

In the embodiment, the opening in the open state is equivalent to an aperture value of F1.6, and the particular opening 2b is equivalent to an aperture value of F4.0. Through such control, the aperture opening is reduced to a degree before the ND filter 1 is inserted, which reduces the area to be covered by the ND filter 1 to cover the aperture opening 2b. Inserting the ND filter 1 while maintaining the aperture opening 2b with a relatively large area, which is equivalent to an aperture value of F4.0, reduces the influence of diffraction of light caused by an opening formed by the aperture opening and the end portion of the ND filter 1.

In the embodiment, the aperture opening 2b with which the ND filter 1 is inserted is equivalent to an aperture value of F4.0. However, the aperture opening 2b may be equivalent to any F value. Meanwhile, in the stage (F4b) before the entirety of the aperture opening is covered by the ND filter 1, a great phase difference is caused in the aperture opening between a portion in which the ND filter 1 is provided and a portion in which the ND filter 1 is not provided.

The ND filter 1 according to the embodiment includes the recessed portion 102 formed in the distal-end region 101 on the side of interposition in the aperture opening. That is, with the end portion of the ND filter 1 formed in the shape described above as shown in FIGS. 1 and 3, the phase difference described above is caused in both the direction connecting the second regions P1 and P2 at the end portion of the ND filter 1 and the direction perpendicular thereto, which results in a small difference in resolving power between the two directions. Further, with the end portion of the ND filter 1 according to the embodiment formed in the shape described above, there is no occurrence of a straight light streak with a high intensity extending in the vertical direction of the photographing screen due to diffraction of light by a straight portion at the end portion of the ND filter 1.

Figure 13:
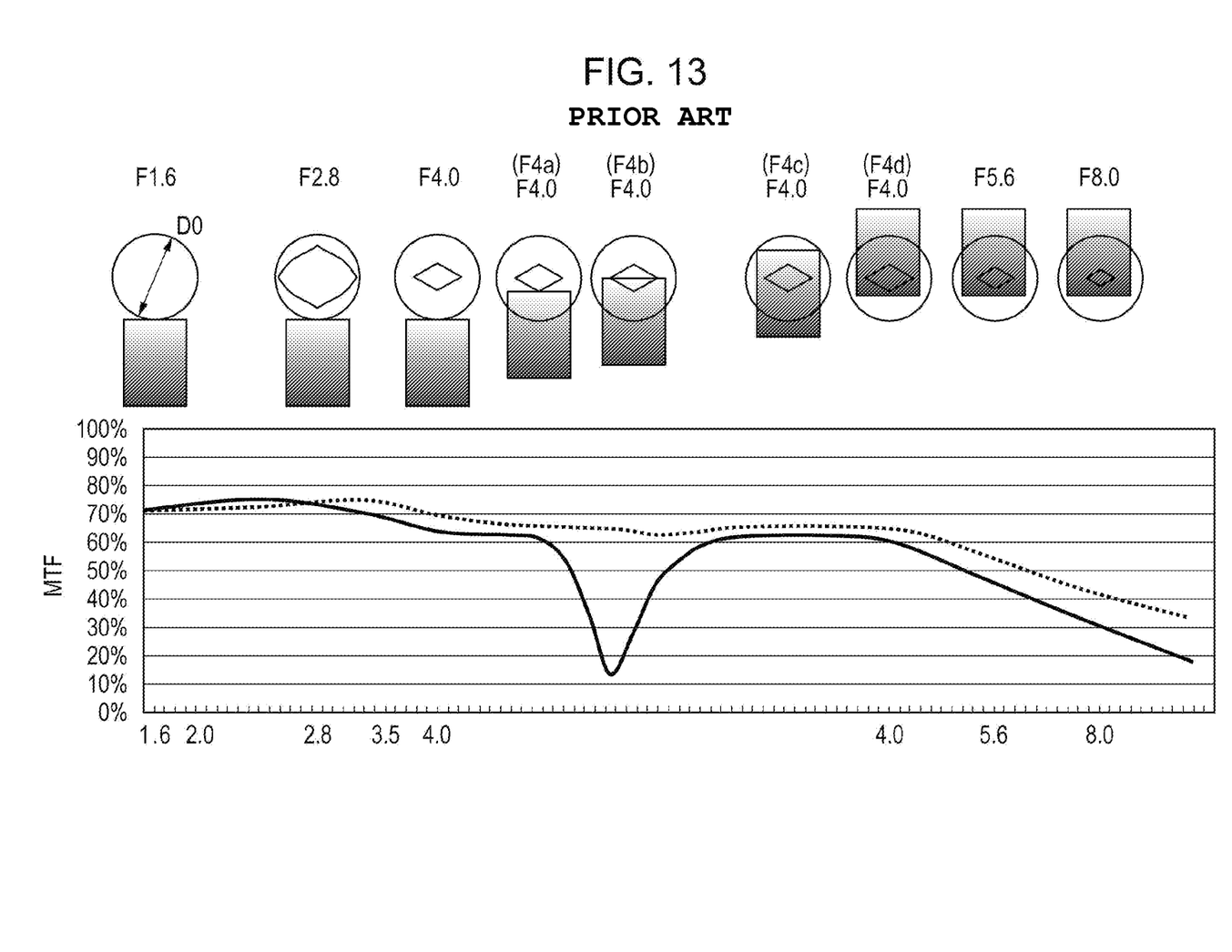
FIG. 13 illustrates the relationship between the state of an ND filter and an aperture opening and MTF according to the related art.

In order to clarify the effect of the present invention, the state of an ND filter and an aperture opening of a light quantity adjustment device according to the related art will be described below with reference to FIG. 13. FIG. 13 illustrates exposure control according to the related art, and corresponds to FIG. 5 for the first embodiment. The upper portion of FIG. 13 shows the positional relationship between the aperture opening formed by the aperture blades and the ND filter 1 at each aperture value. The lower portion of FIG. 13 shows a graph in which the horizontal axis represents the aperture value (Fno), and the vertical axis represents the MTF. The arrangement of figures in the upper part of FIG. 13 generally corresponds to the horizontal axis of the graph in the lower part of FIG. 13. The ND filter 1 starts moving from the position at which it is disposed at an aperture value of F1.6 in FIG. 13.

In the MTF graph in the lower part of FIG. 13, the solid line indicates the MTF read in the vertical direction of the photographing screen, and the dotted line indicates the MTF read in the horizontal direction of the photographing screen. The distal-end surface of the ND filter 1 according to the related art extends straight in the direction perpendicular to the direction of interposition in the optical path, and the entirety of the distal-end surface of the ND filter 1 extends at an angle of 90 degrees with respect to the vertical direction of the photographing screen.

The transmittance of the region of the ND filter 1 through which light flux passes is configured to be continuously reduced to a desired transmittance from the distal end over a particular region, and to be uniform thereafter. In the light quantity adjustment device according to the related art, the ND filter and the aperture opening are driven separately to adjust the quantity of light to reach the image pickup element. The area of the aperture opening is varied from the open state at an aperture value of F1.6 to an aperture value of F4.0 (F4a). The ND filter is driven to be inserted without varying the area of the aperture opening from an aperture value of F4.0 (F4a) until the ND filter is fully inserted (F4d). The area of the aperture opening is varied again after the ND filter is fully inserted (F4d).

When the light quantity adjustment device according to the related art is driven as described above, and the distal-end surface of the ND filter 1 lies over the opening equivalent to an aperture value of F4.0 (F4b), a great phase difference is caused in the aperture opening between a portion in which the ND filter 1 is provided and a portion in which the ND filter 1 is not provided in the direction perpendicular to the distal-end surface of the ND filter 1. The resolving power is significantly reduced in the direction in which a great phase difference is caused. In the direction parallel to the distal-end surface of the ND filter 1, in contrast, the phase difference described above is not caused, and therefore the resolving power is not reduced. Thus, a difference in resolving power is caused between the direction of the distal-end surface of the ND filter 1 and the direction perpendicular thereto, which unfavorably results in an unnatural image.

Further, when the light quantity adjustment device according to the related art is driven as described above, and the distal-end surface of the ND filter 1 lies over the opening equivalent to an aperture value of F4.0 (F4b), light is intensively diffracted in the direction perpendicular to the straight shape of the end surface of the ND filter 1. Consequently, a light streak with a high intensity extending in the vertical direction of the photographing screen similar to a smear is caused when a luminous object enters the photographing screen, which results in an unfavorable image. In the embodiment configured as discussed above, in contrast, a phase difference is provided in both the direction of interposition of the ND filter 1 and the direction perpendicular thereto. Thus, the difference in resolving power between the two directions is mitigated so that good optical performance is obtained.

The interposition aperture opening (F4a of FIG. 5) at which the ND filter 1 is interposed, among a plurality of configurations of the aperture opening with different areas or shapes formed by the aperture mechanism 2, is formed with a straight opening portion 104 at the end portion of the interposition aperture opening (F4a). The angle formed by a direction of interposition (direction of insertion/removal) 103 of the ND filter 1 and the straight opening portion 104 is defined as θsp. Meanwhile, the recessed portion 102 of the ND filter 1 includes a straight cut portion 105. The angle formed between the direction of interposition (direction of insertion/removal) 103 of the ND filter 1 and the straight cut portion 105 is defined as θnd. Then, the following conditional expression is satisfied:

$$0.0 \leq |\sin(\theta sp - \theta nd)| < 0.4 \quad (1)$$

In the embodiment, the angles θsp and θnd are each 60 degrees. With the angles θsp and θnd set as described above, a light streak due to diffraction caused by the aperture blades 21 and 22 and a light streak due to diffraction caused by the ND filter 1 that occur on the photographing screen overlap each other, which makes the light streaks less conspicuous. If the range defined by the conditional expression (1) is exceeded, a light streak due to diffraction caused by the aperture blades 21 and 22 and a light streak due to diffraction caused by the ND filter 1 may occur to extend in different directions from each other, which causes unfavorable results on the photographing screen.

In the embodiment, the ND filter 1 and the aperture opening 2a, 2b are both shaped to be line-symmetric with respect to an axis passing through the center of the opening and extending in the direction of insertion/removal of the ND filter 1. However, different angles may be used on the left and right sides to select particular angles. Preferably, the range of the conditional expression (1) is set as follows:

$$0.00 \leq |\sin(\theta sp - \theta nd)| < 0.35 \quad (1a)$$

More preferably, the range of the conditional expression (1a) is set as follows:

$$0.0 \leq |\sin(\theta sp - \theta nd)| < 0.3 \quad (1b)$$

When the end portion of the ND filter 1 is located in the middle of the aperture opening 2b (F4b), it is necessary to suppress unevenness in light quantity in the photographing screen. Further, it is preferable that the drive region in which the end portion of the ND filter 1 partially lies over the light passage region, that is, the region in which the MTF of the imaging optical system is disadvantageous, is passed while variations in quantity of light that reaches the plane of focus are small. In addition, it is preferable that the aperture opening is less likely to become smaller than such a small size that desired resolving power can be maintained even if a luminous object enters the photographing screen.

The transmittance of the center region of the recessed portion 102 in the distal-end region 101 of the ND filter 1 is defined as Ta, and the lowest transmittance of the transmittances of regions of the ND filter 1 through which light flux passes is defined as Tb. Then, the following conditional expression is preferably satisfied:

$$1.5 < Ta/Tb < 200.0 \quad (2)$$

If the upper limit value of the conditional expression (2) is exceeded, the lowest transmittance of the ND filter 1 may be so low that unevenness in light quantity in the photographing screen may be unfavorably significant when the ND filter 1 is fully inserted in the optical path. If the lower limit value of the conditional expression (2) is exceeded, meanwhile, the transmittance of the distal-end portion of the ND filter 1 may be so low that the quantity of light that reaches the image pickup element may vary significantly when the distal-end surface of the ND filter 1 passes through the light passage region. This unfavorably increases unevenness in light quantity in the photographing screen. In addition, the region in which the MTF of the photographing optical system is low is unfavorably utilized over a wide range. Preferably, the range of the conditional expression (2) is set as follows:

$$1.7 < Ta/Tb < 150.0 \quad (2a)$$

More preferably, the range of the conditional expression (2a) is set as follows:

$$1.9 < Ta/Tb < 100.0 \quad (2b)$$

In the embodiment, the transmittance Ta is 50.1%, and the transmittance Tb is 10.0%. Further, in the region 1B in which the transmittance continuously varies in the direction of interposition of the ND filter 1 (the direction orthogonal to the optical axis), the transmittance becomes constantly lower from the end portion of the ND filter 1 toward the region 1C. The transmittance continuously varies at the boundaries between the region 1A and the region 1B and between the region 1B and the region 1C.

In this way, the transmittance is set to become gradually lower as the ND filter 1 is inserted in the optical path from the end portion. This prevents unevenness in light quantity in the photographing screen due to the transmittance set for the ND filter 1.

The ND filter 1 according to the embodiment is configured such that the minimum radius of curvature of the recessed portion 102 of the distal-end surface of the ND filter 1 meets the following conditional expression:

$$0.001 < Rnd/Dnd < 10.000 \quad (3)$$

In the expression, Rnd indicates the minimum radius of curvature of the aperture passage region of the recessed portion 102 at the end portion of the ND filter 1, and Dnd indicates the width of the aperture passage region of the recessed portion 102 at the end portion of the ND filter 1 (the width of the aperture passage region of the ND filter 1). With such a configuration, diffraction of light caused in the region with the minimum radius of curvature in the distal-end surface of the ND filter 1 when a luminous object enters the photographing screen is suppressed, which prevents occurrence of a light streak from the luminous object in the photographing screen.

If the upper limit value of the conditional expression (3) is exceeded, the radius of curvature at a corner portion of the distal-end surface of the ND filter 1 may be too large, which may result in a nearly straight shape. This may result in occurrence of a light streak due to diffraction caused by the ND filter 1 extending in an unnatural direction, and hence in an unfavorable image. If the lower limit value of the conditional expression (3) is exceeded, the radius of curvature at a corner portion of the distal-end surface of the ND filter 1 may be too small, which may make the ND filter 1 difficult to manufacture. Preferably, the range of the conditional expression (3) is set as follows:

$$0.005 < Rnd/Dnd < 7.000 \tag{3a}$$

More preferably, the range of the conditional expression (3a) is set as follows:

$$0.010 < Rnd/Dnd < 5.000 \tag{3b}$$

In the embodiment, when the aperture is in the open state, the ND filter 1 does not overlap the light passage region D0 with the aperture open. However, when the aperture is in the open state, the ND filter 1 may partially overlap the light passage region D0 only to such a degree that no significant variation occurs from the F value of the imaging optical system with the aperture open. The phrase "to such a degree that no significant variation occurs from the F value of the imaging optical system with the aperture in the open state" means that the average transmittance for the entire light passage region D0 with the aperture open exceeds 80%, for example.

In the embodiment, the ND filter 1 is driven when the aperture opening 2b is equivalent to an aperture value of F4.0 (F4a in FIG. 3). The area over which the region 1C with a uniform transmittance overlaps the aperture opening 2b when the ND filter 1 is inserted until the maximum drive amount of the ND filter 1 is reached (F4d in FIG. 3) is set to be larger than 50% of the area of the aperture opening 2b. With such setting, variations in average transmittance of the aperture opening 2b due to a manufacturing error are reduced while sufficiently reducing the average transmittance of the aperture opening 2b when the ND filter 1 is inserted until the maximum drive amount of the ND filter 1 is reached.

According to the embodiment described above, it is possible to obtain a light quantity adjustment device that does not cause a light streak with a high intensity extending in the vertical direction of the photographing screen similar to a smear, that has no unused region, and that provides little difference in resolving power between directions with respect to the screen.

Other embodiments of the present invention will be described below. The other embodiments are the same as the first embodiment discussed above in drive of the ND filter 1 and the aperture blades 21 and 22. In addition, variations in MTF along with such drive are substantially similar. Therefore, such same or similar factors will not be described.

Second Embodiment

Figure 6:
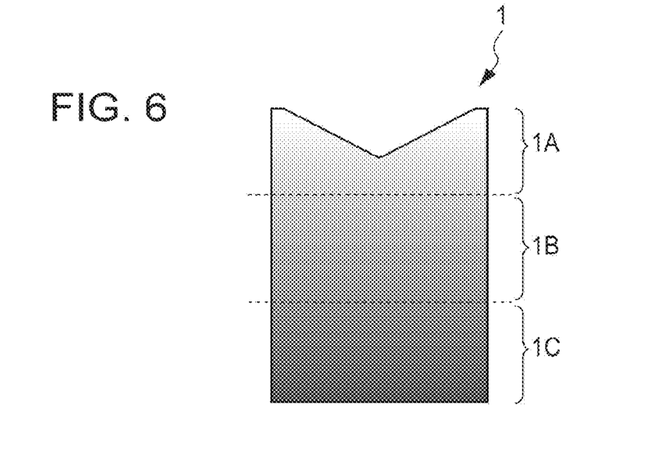
FIG. 6 is a schematic diagram showing the configuration of an ND filter according to a second embodiment of the present invention.

FIG. 6 illustrates the ND filter 1 according to a second embodiment of the present invention. In the embodiment, the transmittance of the region 1A including the end portion of the ND filter 1 is 50%, and the transmittance of the region 1C of the ND filter 1 is 25.1%. The transmittance of the region 1B continuously varies in the direction of interposition of the ND filter 1 in the optical path. The transmittance of the region 1B is 50.1% at the boundary with the region 1A, and 25.1% at the boundary with the region 1C. In the embodiment, the angles $\theta$sp and $\theta$nd in the conditional expression (1) are 60 degrees and 50 degrees, respectively.

Third Embodiment

Figure 7:
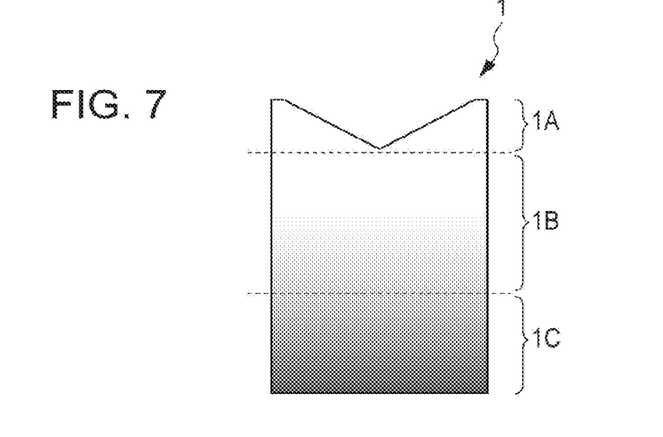
FIG. 7 is a schematic diagram showing the configuration of an ND filter according to a third embodiment of the present invention.

FIG. 7 illustrates the ND filter 1 according to a third embodiment of the present invention. In the embodiment, the transmittance of the region 1A including the end portion of the ND filter 1 is 100%, and the transmittance of the region 1C of the ND filter 1 is 10%. The transmittance of the region 1B continuously varies in the direction of interposition of the ND filter 1 in the optical path. The transmittance of the region 1B is 100% at the boundary with the region 1A, and 10% at the boundary with the region 1C.

In the embodiment, the angles $\theta$sp and $\theta$nd in the conditional expression (1) are each 60 degrees. In the embodiment, the end portion of the ND filter 1 has a transmittance of 100%, that is, serves as a transparent portion. However, the average transmittance of the entirety of the aperture opening 2b can be varied even before the ND filter 1 covers the entirety of the aperture opening 2b. That is, the drive region in which the aperture opening 2b includes both a portion in which the ND filter 1 is provided and a portion in which the ND filter 1 is not provided is utilized to adjust the light quantity. Therefore, the end portion of the ND filter 1 is not an unused region even though it is a transparent portion.

Fourth Embodiment

Figure 8:
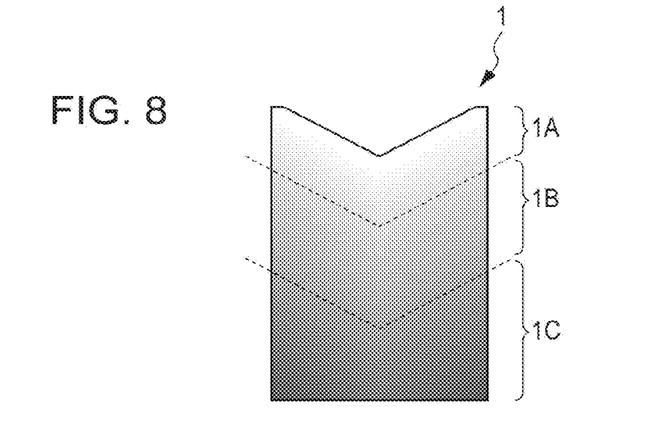
FIG. 8 is a schematic diagram showing the configuration of an ND filter according to a fourth embodiment of the present invention.
Figure 9:
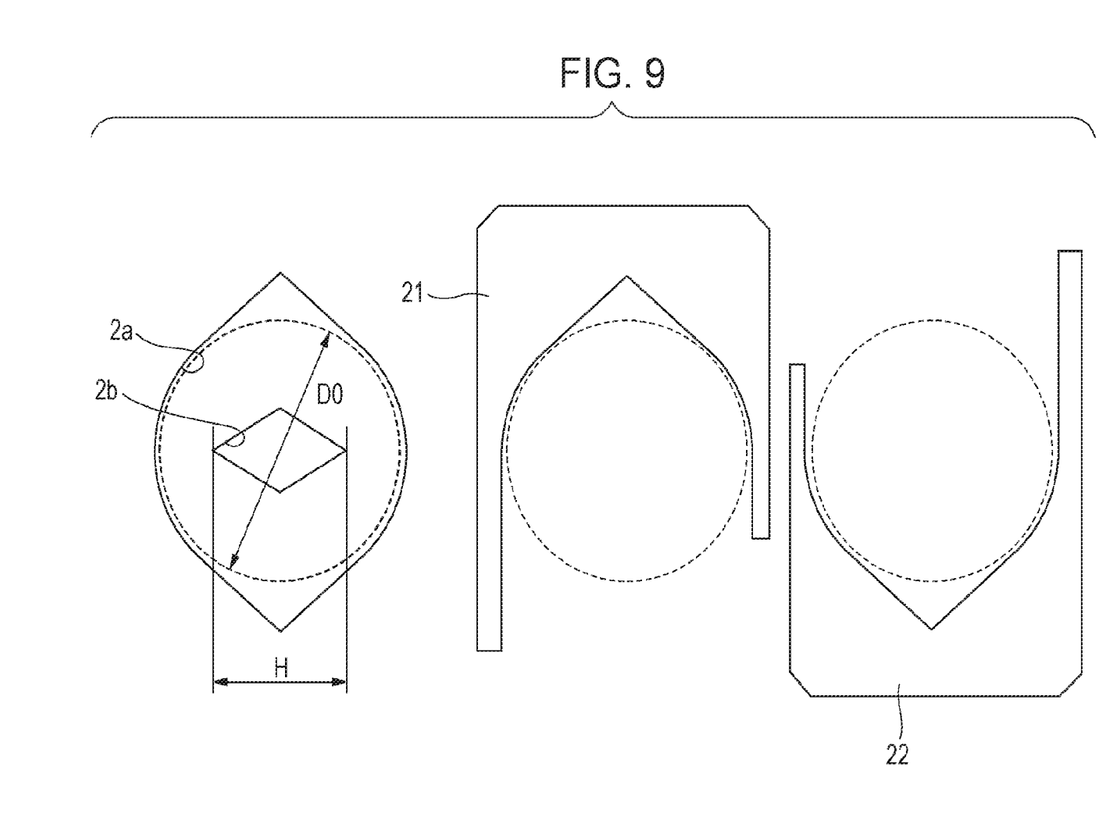
FIG. 9 is a schematic diagram showing the shape of the aperture opening and the configuration of aperture blades according to the fourth embodiment of the present invention.

FIG. 8 illustrates the ND filter 1 according to a fourth embodiment of the present invention. FIG. 9 shows a schematic configuration of the aperture blades 21 and 22 of the aperture mechanism 2 and the aperture opening 2a, 2b formed by the aperture blades 21 and 22 according to the fourth embodiment. Reference symbol 2a indicates the aperture opening in the open state, and 2b indicates the insertion aperture opening at the time when the ND filter 1 is inserted. Reference symbol D0 indicates a light passage region of the imaging optical system through with the aperture in the open state. Reference symbol H indicates the width of the region for passage through the aperture opening at the time when the ND filter 1 is disposed in the optical path.

In the embodiment, the transmittance of the region 1A including the distal-end surface of the ND filter 1 is 50.1%, and the transmittance of the region 1C of the ND filter 1 is 10%. The transmittance of the region 1B continuously varies. The transmittance of the region 1B is 50.1% at the boundary with the region 1A, and 10% at the boundary with the region 1C. Unlike the first to third embodiments, the boundaries between the region 1A and the region 1B and between the region 1B and the region 1C are not straight. Each of the boundaries has a V-shape with an opening angle of 120 degrees.

The boundaries between the regions with different transmittances may be shaped differently from those according to the embodiment, and may be curved. In addition, the boundaries between the region 1A and the region 1B and between the region 1B and the region 1C may be shaped differently from each other. In the embodiment, the angles θsp and θnd in the conditional expression (1) are 50 degrees and 65 degrees, respectively.

Fifth Embodiment

Figure 10:
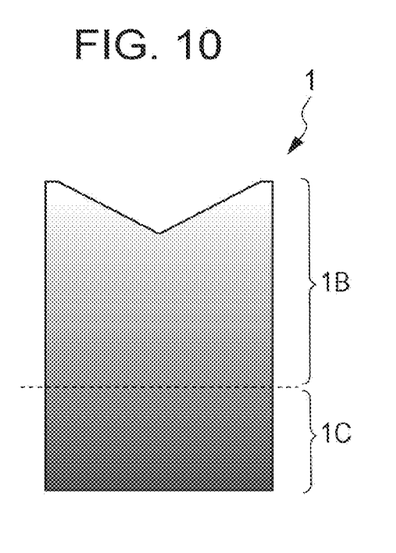
FIG. 10 is a schematic diagram showing the configuration of an ND filter according to a fifth embodiment of the present invention.

FIG. 10 illustrates the ND filter 1 according to a fifth embodiment of the present invention. In the embodiment, there is no region 1A with a uniform transmittance, and the region 1B with a continuously varying transmittance extends from the end portion of the ND filter 1 to the boundary with the region 1C with a uniform transmittance. The transmittance of the region 1C is 10%. The transmittance at the boundary between the region 1B and the region 1C is 10%. In the embodiment, the angles θsp and θnd in the conditional expression (1) are 60 degrees and 65 degrees, respectively.

Sixth Embodiment

Figure 11:
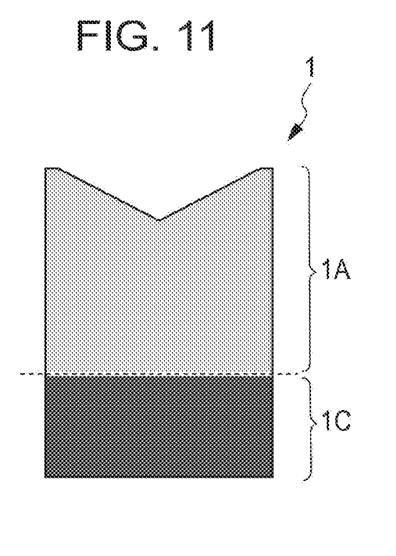
FIG. 11 is a schematic diagram showing the configuration of an ND filter according to a sixth embodiment of the present invention.

FIG. 11 illustrates the ND filter 1 according to a sixth embodiment of the present invention. In the embodiment, there is no region 1B with a continuously varying transmittance, and the region 1A with a uniform transmittance extends from the end portion of the ND filter 1 to the boundary with the region 1C with a uniform transmittance. The transmittance of the region 1A is 50.1%, and the transmittance of the region 1C is 10%. In the embodiment, the angles θsp and θnd in the conditional expression (1) are each 60 degrees.

Seventh Embodiment

Figure 12:
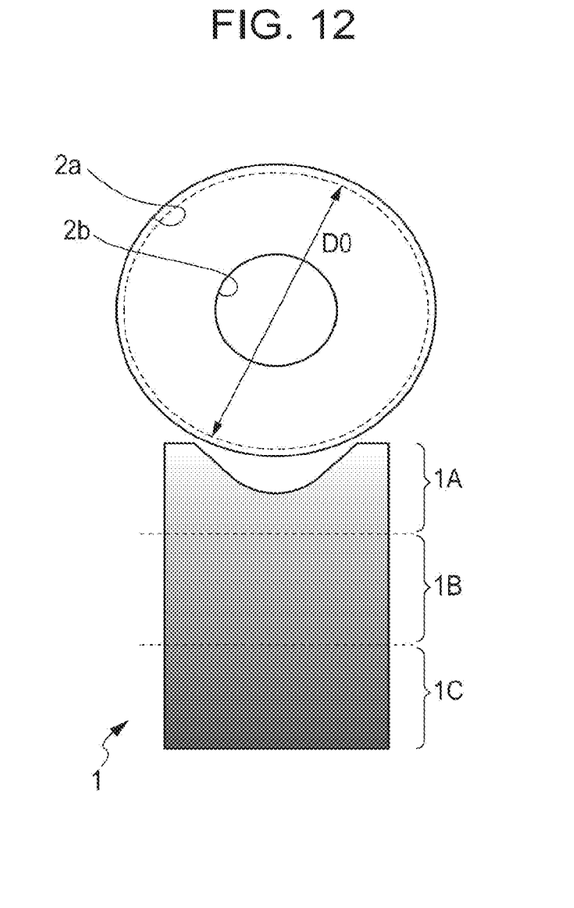
FIG. 12 is a schematic diagram showing the configuration of an ND filter and an aperture opening according to a seventh embodiment of the present invention.

FIG. 12 illustrates the ND filter 1 and the aperture opening 2a, 2b of the aperture mechanism 2 according to a seventh embodiment of the present invention. In the embodiment, the aperture opening is formed to have a circular shape, and accordingly the distal-end surface of the ND filter 1 is formed with a recessed portion with an arcuate shape that conforms to the particular opening 2b. With such setting, occurrence of a straight light streak can be prevented by both the aperture opening 2b and the ND filter 1.

The embodiment does not impose a limitation that the distal-end surface of the ND filter 1 should have an arcuate shape in the case where the aperture opening 2b has a circular shape. The end surface of the ND filter 1 may be shaped as in the first to sixth embodiments, in which case no ghost due to diffraction extending in the vertical direction appears on the screen. Likewise, the distal-end surface of the ND filter 1 may have an arcuate shape in the case where the aperture opening has a diamond shape as with the aperture opening 2b in FIG. 2.

In the embodiment, the transmittance of the region 1A including the end portion of the ND filter 1 is 50.1%, and the transmittance of the region 1C of the ND filter 1 is 10%. The transmittance of the region 1B continuously varies in the direction of interposition of the ND filter 1 in the optical path. The transmittance of the region 1B is 50.1% at the boundary with the region 1A, and 10% at the boundary with the region 1C.

By applying the light quantity adjustment device according to each of the embodiments to an optical apparatus such as a video camera, it is possible to obtain a good image with no occurrence of a light streak with a high intensity extending in the vertical direction of the photographing screen similar to a smear and with little difference in resolving power between directions with respect to the photographing screen. The numerical values for the conditional expressions (1) to (3) relating to the embodiments discussed above are shown in Table.

TABLE

|  |  | First embodiment | Second embodiment | Third embodiment | Fourth embodiment | Fifth embodiment | Sixth embodiment | Seventh embodiment |
| --- | --- | --- | --- | --- | --- | --- | --- | --- |
| Conditional expression (1) | $|\sin(\theta sp - \theta nd)|$ | 0.00 | 0.17 | 0.00 | 0.26 | 0.09 | 0.00 | No straight portion |
| Conditional expression (2) | Ta/Tb | 5.01 | 2.00 | 10.00 | 5.01 | 7.50 | 5.01 | 5.01 |
| Conditional expression (3) | Rnd/Dnd | 0.02 | 0.02 | 0.02 | 0.02 | 0.05 | 0.02 | 2.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-025582 filed Feb. 9, 2011, which is hereby incorporated by reference herein in its entirety.

What is claimed is:

1. A light quantity adjustment device comprising:
    an aperture mechanism that varies an aperture opening through drive of aperture blades to restrict a quantity of light that passes through the aperture opening; and
    an ND filter inserted in and removed from an optical path on a light incident side or a light exit side of the aperture opening,
    wherein the ND filter has a distribution of transmittance in which the transmittance differs in a direction of interposition of the ND filter in the optical path of the aperture opening, and includes a recessed portion formed by recessing a center portion of a distal-end region of the ND filter on a side of interposition in the optical path of the aperture opening in a direction opposite the direction of interposition.

2. The light quantity adjustment device according to claim 1,
    wherein when the aperture opening formed by the aperture mechanism at which the ND filter is interposed is defined as an interposition aperture opening, an end portion of the interposition aperture opening includes a straight opening portion, an angle formed between the direction of interposition of the ND filter and the straight opening portion being defined as θsp, the recessed portion of the ND filter includes a straight cut portion, an angle formed by the direction of interposition of the ND filter and the straight cut portion being defined as θnd, and the following conditional expression is satisfied:

$$0.0 \leq |\sin(\theta sp - \theta nd)| < 0.4.$$

3. The light quantity adjustment device according to claim 1, wherein when the transmittance of a center region of the recessed portion in the distal-end region of the ND filter is defined as Ta, and the lowest transmittance of transmittances of regions of the ND filter through which light flux passes is defined as Tb, then the following conditional expression is satisfied:

$$1.5 < Ta/Tb < 200.0.$$

4. The light quantity adjustment device according to claim 1, further comprising:

an ND filter drive unit that drives the ND filter; and an aperture drive unit that drives the aperture blades to vary an area of the aperture opening.

5. An image pickup apparatus comprising:

an optical system including a light quantity adjustment device; and an image pickup element that receives light for an image formed by the optical system, the light quantity adjustment device comprising:

an aperture mechanism that varies an aperture opening through drive of aperture blades to restrict a quantity of light that passes through the aperture opening; and an ND filter inserted in and removed form an optical path on a light incident side or a light exit side of the aperture opening, wherein the ND filter has a distribution of transmittance in which the transmittance differs in a direction of interposition of the ND filter in the optical path of the aperture opening, and includes a recessed portion formed by recessing a center portion of a distal-end region of the ND filter on a side of interposition in the optical path of the aperture opening in a direction opposite the direction of interposition.

6. A light quantity adjustment device comprising:

an aperture mechanism configured to adjust an aperture opening by driving aperture blades that control a flux of light that passes through the aperture opening; and an ND filter configured to be removably interposed in an optical path of the light that passes through the aperture opening, wherein the ND filter has a transmittance distribution in which the transmittance differs in a direction of interposition of the ND filter in the optical path of the aperture opening, and wherein the ND filter includes a recessed portion formed on a distal-end of the ND filter, the recessed portion being formed in a direction opposite to the direction of interposition.

7. The light quantity adjustment device according to claim 6, wherein the ND filter is inserted in and removed from the optical path either on a light incident side or a light exit side of the aperture opening in a direction perpendicular to the optical path.

8. The light quantity adjustment device according to claim 7, wherein the recessed portion of the ND filter includes a first region and second regions, and wherein, when the ND filter is inserted in or removed from the optical path, the first region passes through a center portion of the aperture opening and the second regions pass through peripheral portions of the aperture opening.

9. The light quantity adjustment device according to claim 8, wherein the recessed portion of the ND filter includes a cut portion that extends from the first region to the second regions of the recessed portion.

* * * * *